United States Patent
Schick et al.

[11] Patent Number: 5,834,782
[45] Date of Patent: Nov. 10, 1998

[54] LARGE AREA IMAGE DETECTOR

[75] Inventors: David B. Schick, Flushing; Daniel A. Neugroschl, New York; David B. Plass, Merrick; Jonathan Singer, Dobbs Ferry, all of N.Y.

[73] Assignee: Schick Technologies, Inc., Long Island City, N.Y.

[21] Appl. No.: 754,095

[22] Filed: Nov. 20, 1996

[51] Int. Cl.⁶ .................................. G01T 1/20; G01T 1/24
[52] U.S. Cl. .......................... 250/370.11; 250/208.1; 250/367; 250/368; 250/370.09
[58] Field of Search ........................ 250/370.09, 208.1, 250/227.2, 368, 370.08, 367, 370.11, 349

[56] References Cited

U.S. PATENT DOCUMENTS

| | | | |
|---|---|---|---|
| 4,467,342 | 8/1984 | Tower | 257/443 |
| 4,755,681 | 7/1988 | Oka et al. | 250/370.01 |
| 4,999,484 | 3/1991 | Kaneko | 250/208.1 |
| 5,043,582 | 8/1991 | Cox et al. | 250/370.09 |
| 5,105,087 | 4/1992 | Jagielinski | 250/370.09 |
| 5,248,885 | 9/1993 | Sato et al. | 250/370.15 |
| 5,381,013 | 1/1995 | Cox et al. | 250/370.09 |
| 5,420,429 | 5/1995 | Ederhard et al. | 250/367 |
| 5,420,452 | 5/1995 | Tran et al. | 257/428 |
| 5,436,458 | 7/1995 | Tran et al. | 250/340.09 |
| 5,464,984 | 11/1995 | Cox et al. | 250/370.11 |
| 5,572,034 | 11/1996 | Karellas | 250/368 |

OTHER PUBLICATIONS

Optical Engineering, Sep. 1987, pp. 897–901, D. C. Harrison et al., "Large Area Focal Plane Comprising Charge-—Coupled Devices and Fiber Optics".

Proceeding of the 1978 International Conference on the Application of Charge Coupled Devices, pp. 25–40, A. Ibrahim et al., "A High Resolution Buttable Time Delay And Integrate Imaging CCD".

*Primary Examiner*—Carolyn E. Fields
*Attorney, Agent, or Firm*—Fitzpatrick, Cella, Harper & Scinto

[57] ABSTRACT

A large area image detecting apparatus made by arranging a plurality of small area sensors in a stepped arrangement so that the inactive regions of the small sensors are covered by a active area of another small sensor. The apparatus may be used to detect light or radiation. A fiber optic assembly may be used to guide light from a flat scintillator plate onto the small sensors.

47 Claims, 4 Drawing Sheets

FIG. 4A
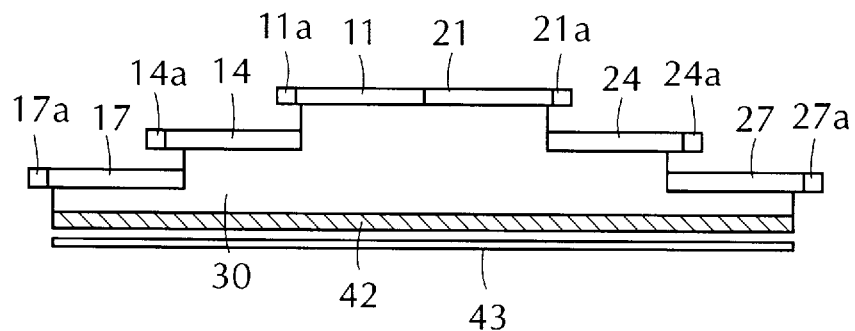
FIG. 4B
| | | | | | | |
|---|---|---|---|---|---|---|
| 19a— | 19 | 16 | 13 | 23 | 26 | 29 |—29a
| 18a— | 18 | 15 | 12 | 22 | 25 | 28 |—28a
| 17a— | 17 | 14 | 11 | 21 | 24 | 27 |—27a
FIG. 4C
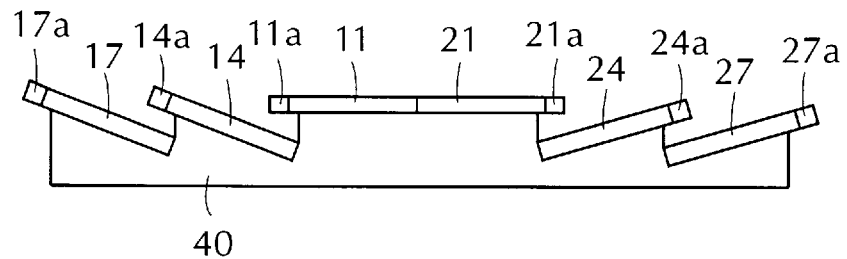

LARGE AREA IMAGE DETECTOR

BACKGROUND OF THE INVENTION

This invention relates to an apparatus for obtaining a high resolution optical or x-ray image of a large object. Specifically, the apparatus uses a plurality of small sensors arranged in a three-dimensional pattern to cover a large area. The arrangement of the sensors minimizes problems at the boundaries of the small sensors.

Conventionally, photographic film is used to obtain an x-ray image of large anatomical objects. The film is placed on one side of the object and an x-ray source is placed on the other side. X-rays from the x-ray source are aimed through the object, at the film. A portion of the x-rays are absorbed by the object, and a portion of the x-rays pass through the object and strike the film. When the film is developed, a two-dimensional image depicting the object is recorded on the film.

One serious problem with conventional film-based x-rays is that the patient is exposed to a relatively large dose of radiation. While improvements in film sensitivity have reduced the radiation dosage over the years, the dose is still unnecessarily high. This problem is particularly troublesome when obtaining x-rays of pregnant women and small children. In both these cases, the concerns associated with exposure to radiation are heightened.

Another problem with conventional film-based x-rays is that the film must be developed. Developing is time consuming, and takes on the order of five minutes. While this delay is in some cases a mere nuisance, in other cases it is a matter of life and death. In certain circumstances, medical attention must be delayed until the x-rays become available. During this time, a patient's condition may deteriorate substantially. In extreme cases, a delay in treatment can result in the death of a patient. Even in non-emergency situations, the delay can result in inconvenience or prolonged pain.

This situation is compounded by the fact that when certain problems occur during the x-ray exposure and development process, the problem does not become apparent until after the film is developed. One example of this type of problem is a blurry image caused by movement of the patient during the exposure. When the problem is eventually discovered after the film is developed, the entire time-consuming process must be repeated until it is right. Thus, the delay may extend to ten or fifteen minutes, or perhaps longer.

The equipment and chemicals used to develop film based x-rays create additional problems. The equipment is expensive, takes up valuable office space, and typically requires attention by an operator. Moreover, the chemicals used to develop the x-ray films may be harmful to the environment.

Various attempts have been made to deal with these problems by eliminating the need for photographic film. For example, U.S. Pat. No. 4,160,997 (Schwartz), the pioneer patent in the field of filmless dental radiography, describes a system for taking dental x-rays using an electronic sensor instead of photographic film. In Schwartz, x-rays which have passed through the patient's teeth are converted into light by a scintillator, and the light is converted to electrical signals by a charge coupled device (CCD). The screen and the image pickup device are packaged together and connected to an electronic video display system.

Systems of the type described in Schwartz address some of the problems associated with conventional x-rays described above. In particular, because electronic sensors are much more sensitive to x-ray radiation than photographic film, these systems can use a much smaller dose of x-rays to register an image. In addition, because the output of the electronic sensor can be processed very rapidly by a micro-computer, the images are available immediately after the exposure is taken. Also, no development equipment or film developing chemicals are needed.

Thus, systems of the type described in Schwartz are ideal for dental applications. In other applications, however, the small size of the sensor can be a drawback. Fabrication of CCDs, like all semiconductor devices, becomes more and more difficult as the device geometries become larger. So, while these prior art systems are excellent for dental x-rays, where a detector area on the order of one square inch is acceptable, they are less suitable for medical x-rays of larger anatomical objects, such as arms and legs (to detect breaks) and breasts (to detect cancer).

Attempts have been made to apply the concept of an electronic radiation sensor to larger objects. These efforts typically use a plurality of small sensors arranged in specific ways. The outputs of the sensors are combined into a single image by an appropriate image processing system. However, most sensors have a region that does not detect radiation along at least one of its sides. This is illustrated in FIG. 1a, which schematically shows a sensor 101 having an active area 102 and an inactive region 103 along its top side. As a result, if the sensors are laid out next to one another like bathroom tiles, the resulting panel has "blind spots" that cannot detect radiation. These blind spots correspond to the inactive regions of the sensors. Even if a sensor with an inactive region along only one of its sides is used, such as a CMOS active pixel sensor, the largest detector array that can be made without blind spots is a 2×N array of sensors, as shown in FIG. 1b. When sensors with an inactive region along two sides of the sensor are used, the largest array that can be made without blind spots is a 2×2 array, as shown in FIG. 1c.

Various systems have been devised that arrange a plurality of small sensors in particular patterns to obtain coverage of a larger area with no blind spots in the panel. For example, U.S. Pat. No. 4,467,342 (Tower) shows using a plurality of small sensors arranged in overlapping shingle and step patterns to cover a larger area. Tower's system, however, suffers from a number of serious drawbacks. In particular, Tower's system is difficult to fabricate because it requires thinning the sensor chips so that radiant energy can pass through the overlapping end portions of the chips. It also requires precise alignment of the small sensors using a micrometer and a microscope.

Another prior system is described in U.S. Pat. No. 4,755,681 (Oka et al.), which shows a plurality of small sensors arranged in an overlapping shingle pattern. In this system, however, the radiation detecting faces of the sensors are not perpendicular to the incoming radiation, and do not provide a flat focal plane. Rotating Oka's apparatus to make them perpendicular would make it difficult to focus an image on the detecting surface because with Oka's shingle pattern, the required depth of focus increases for each row of sensors.

Finally, the prior systems do not disclose obtaining a traditional photographic x-ray image simultaneously with an electronic image, or using an electronic imaging system to detect possible defects in a photographic x-ray image before the photographic x-ray film is developed.

There is therefore a need to develop a substantially improved large area image detector that departs from past approaches.

SUMMARY OF THE INVENTION

It is accordingly a general object of the present invention to provide a new large area image detector that takes an entirely fresh approach, departing significantly from the concepts and teachings of the prior art, in order to provide improved results.

Another object of the invention is to provide a replacement for photographic film x-rays using a plurality of small sensors that can produce x-ray images of arbitrarily large anatomical structures and yet reduce the patient's exposure to radiation.

Another object of the invention is to minimize blind spots in the image, and to provide an image which is uniform from one sensor to another.

Another object of the invention is to provide a system that is easy to fabricate and does not require precise mechanical alignment of the sensors.

Other objects of the invention include reducing the amount of time required to obtain an image, eliminating the time-consuming process of film developing, and eliminating the use of chemicals required for film developing.

Other objects of the invention include enabling electronic imaging and traditional photographic imaging to be performed simultaneously and detecting defects in the photographic image before development is performed.

A first aspect of the present invention which achieves these objects relates to a radiation detection apparatus for detecting radiation made with at least three sets of radiation sensors. The first set of radiation sensors is arranged in a first plane, on a first side of a reference plane. The second set of radiation sensors is arranged in a second plane, on a second side of the reference plane. The third set of radiation sensors is arranged in a third plane, in front of the first plane, on the first side of the reference plane. Each of the sensors has an active area at a first end of the sensor, and an inactive region. The first end of each sensor is oriented towards the reference plane. The active area of the third set of sensors is disposed in front of the inactive region of the first set of sensors.

Another aspect of the present invention which achieves the aforementioned objects relates to a radiation detecting apparatus for detecting incident radiation. The apparatus has at least three sets of radiation sensors. The radiation sensors each have an active area and an inactive region. The first, second, and third sets of radiation sensors are arranged in first, second, and third planes, respectively. Each of these three planes is substantially perpendicular to the path of the incident radiation. The active areas of at least some of the radiation sensors of the second set are disposed in front of at least some of the inactive regions of sensors of the first set. The active areas of at least some of the radiation sensors of the third set are disposed in front of at least some of the inactive regions of sensors of the second set.

Another aspect of the present invention which achieves the aforementioned objects relates to a radiation detecting apparatus including a fiber optic assembly. The fiber optic assembly has an input side and a stepped output side with a plurality of rises, and optical fibers that transmit light from the input side to the rises of the output side. The apparatus also includes a plurality of radiation sensors. Each sensor has a first end with a rectangular active area extending close to the edges, and an inactive region. The active areas of the sensors are located adjacent to the fiber optic assembly, facing the rise of the steps so that light passing through the fiber optic assembly strikes the active area of the sensors. The inactive region is located above the rise of the steps, so that light passing through the fiber optic assembly does not strike the inactive region. A plurality of sensors are mounted on a given rise butted up next to each other to form a substantially continuous array of active areas. Additional objects, advantages, and features of the invention will become apparent to those skilled in the art upon an examination of the following detailed description of preferred embodiments taken in conjunction with the accompanying drawings.

BRIEF DESCRIPTION OF THE DRAWINGS

FIG. 4a is a side view, partly in section, of one embodiment of the large area image detector of the present invention.

FIG. 4b is a front sectional view of the embodiments of the large area image detector of the present invention depicted in FIGS. 4a and 4c.

FIG. 4c is a side view, partly in section, of a second embodiment of the large area image detector of the present invention.

DETAILED DESCRIPTION OF THE PREFERRED EMBODIMENTS

The large area image detector of the present invention may be used to detect optical images, as well as images using other types of radiation (including x-rays). The following description discusses optical imaging first, followed by imaging with other types of radiation.

Figure 2A:
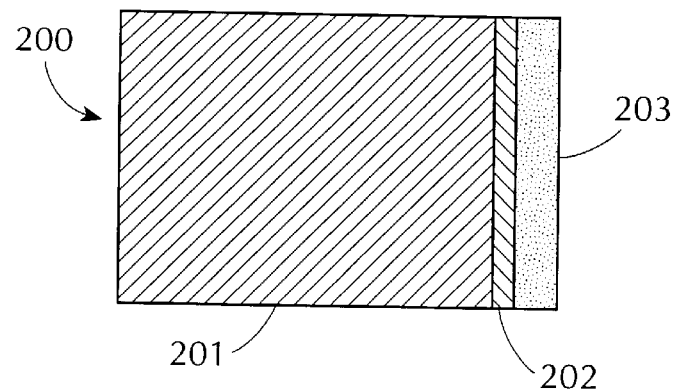
FIG. 2a is a front view of a small image sensor used in the present invention.
Figure 2B:
FIG. 2b is a side view of a small image sensor used in the present invention.

FIGS. 2a and 2b are front and side views of an exemplary sensor 200 which may be used to construct the present invention. The sensor is rectangular, and has a large rectangular active area 201, a thin non-active region 202 and a substrate bonding area 203. This sensor might be a CCD, a CMOS active pixel sensor, a photodiode, or some other type of light-to-electrical signal conversion element. The active area of the preferred sensor comprises a rectangular array of pixels. The sensor generates an output signal that corresponds to the amount of light arriving at each pixel of the sensor during a given time.

Figure 1A:
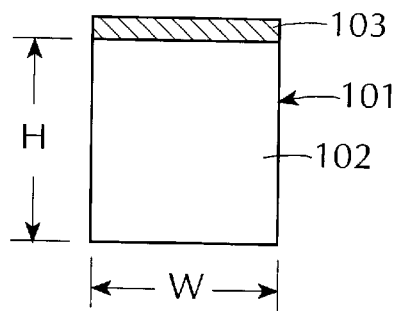
FIG. 1a shows a sensor with an active area and one inactive edge.
Figure 1B:
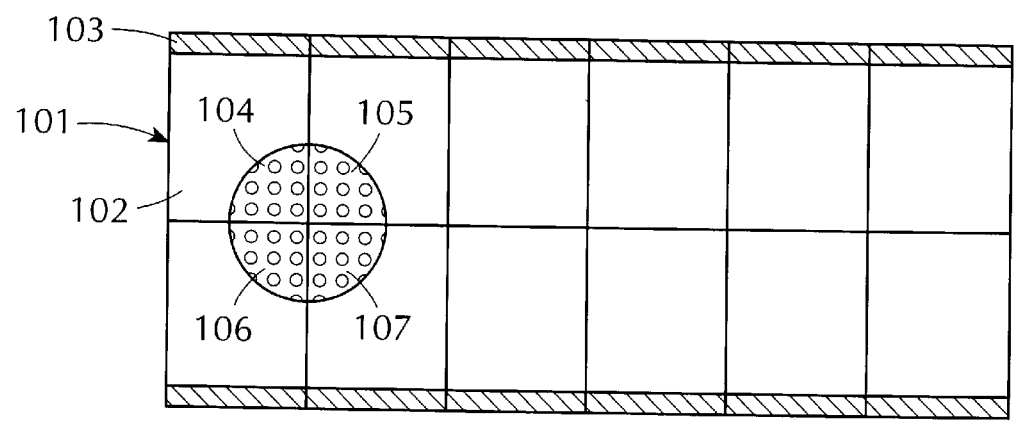
FIG. 1b shows a 2 by 6 array of sensors with one inactive edge.
Figure 1C:
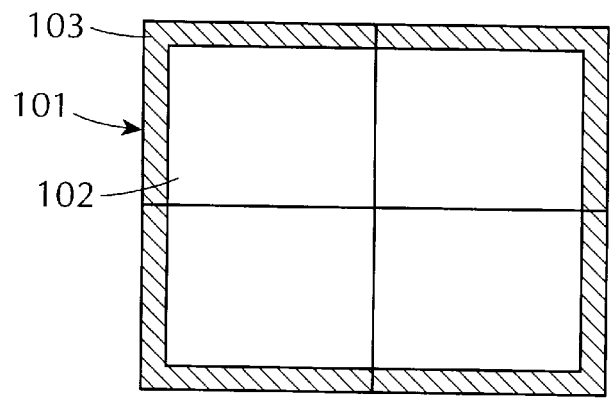
FIG. 1c shows a 2 by 2 array of sensors with two inactive edges.

As shown in FIG. 1b, the active areas of the sensors 101 can be arranged next to one another in a 2×N planar array. When this is done, a composite active area is formed, which covers the sum of the active areas of all of the sensors. Each sensor is preferably comprised of a rectangular array of pixels 104. Ideally, the active area of each sensor is sufficiently close to the edges of the sensor, and the sensors are mounted sufficiently close to one another, so that the pixels of the various sensors are arranged in a continuous, uninterrupted, regularly spaced field. This is illustrated in the circled detail in FIG. 1b, which shows the array of pixels 104 of a first sensor 101 as being very close to the array pixels 105 of the sensor immediately to the right of it, and the array of pixels 106 of the sensor immediately below it.

Under ideal circumstances, the pixels would be close enough to the edge of the sensor so that the distance between two adjacent pixels on the same sensor is the same as the distance between a pixel at the edge of one sensor and a pixel at the adjacent edge of a neighboring sensor. In practice, however, this is difficult to achieve. Deviations from this preferred arrangement may result in a small inactive region on the composite active area at the boundary of the sensors. However, using conventional wafer sawing techniques, this area can be minimized to the width corresponding to two pixels or less.

Ordinary CMOS active pixel devices have a column of drive transistors along one edge of the device, which can increase the width of the inactive region at the sensor's boundary. Moving the column of drive transistors away from the edge of the device reduces this problem by dividing the inactive region into two narrower inactive regions.

This arrangement results in a strip shaped composite active area. The height of the composite active area is 2H, where H is the height of the active area of a sensor 101. The width of the composite active area is NW, where W is the width of the active area of a sensor 101 and N is the number of sensors that are lined up in a given row. The outputs of all of the sensors are sent to an image processing system (not shown) where they are combined into a single composite image. This arrangement enables the imaging of a strip of any given width, by lining up a sufficiently large number of sensors next to one another. Although the width of the strip can be extended in this manner to the extent desired, the height of the strip is limited to two times the height of a sensor because of the band of inactive regions that bounds the composite active area.

Figure 3:
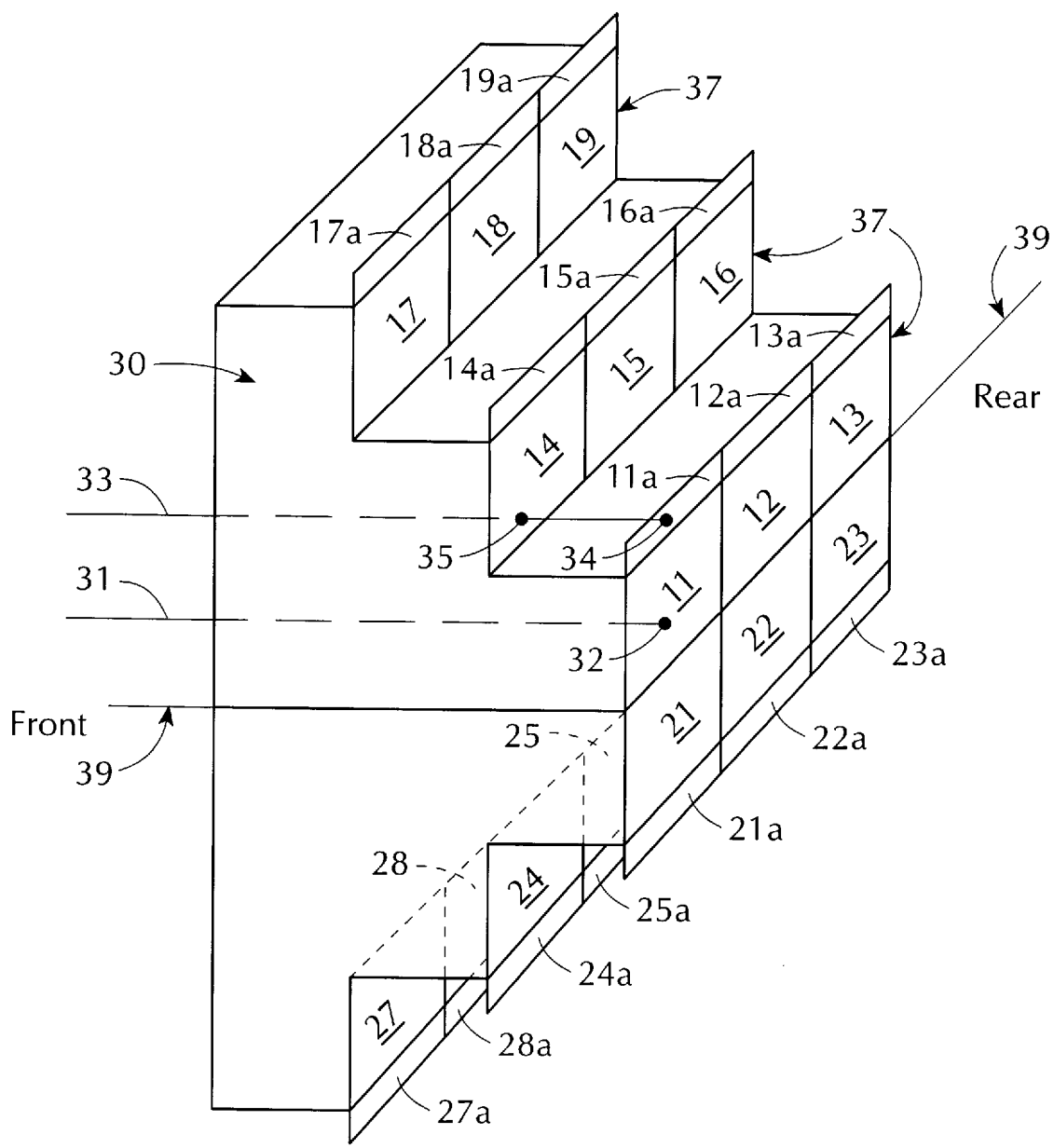
FIG. 3 is a isometric view of one embodiment of the large area image detector of the present invention.

The present invention overcomes this deficiency and provides a large area image detector that can be extended to any height and any width desired. FIG. 3 depicts an embodiment of such a large area image detector. In FIG. 3, light travels in through a fiber optic assembly 30 at the front of the apparatus (shown on the left) to the rear (shown on the right). Fiber optic assembly 30 preferably has a flat front face and a stepped rear face. Each of the steps has a rise 37. The fiber optic assembly 30 transmits light from the front to the rear of the apparatus, with little or no diffusion. The light may be visible, infrared, or ultraviolet.

Figure 5:
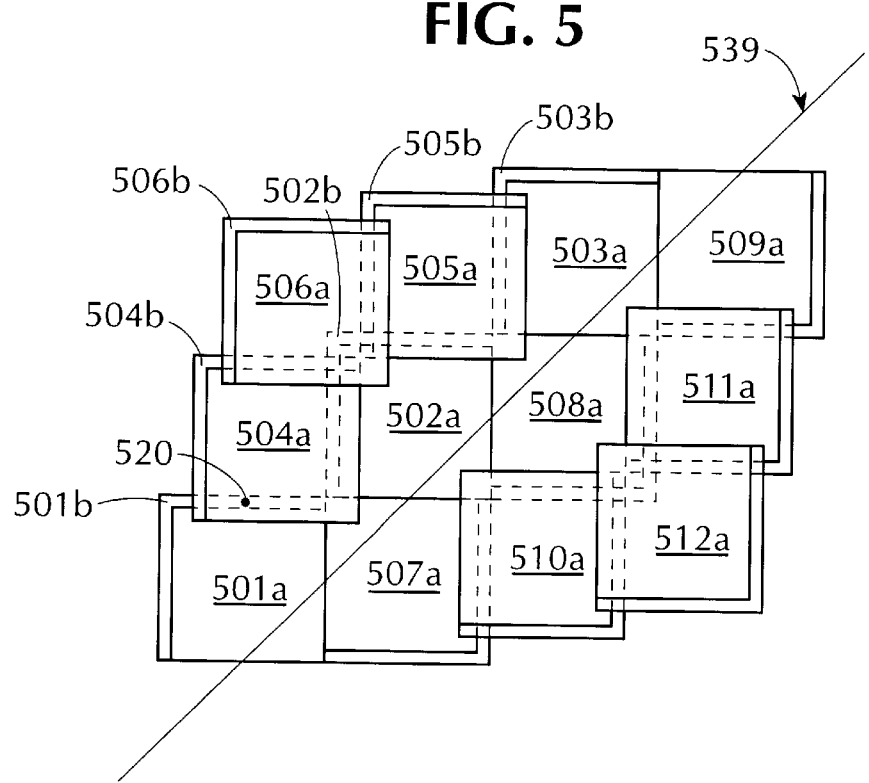
FIG. 5 is a front view of another embodiment of the large area image detector of the present invention.

Sensors 11–29 are mounted so that their active areas (not shown) contact the rises 37 on the rear faces of the fiber optic assembly 30. This enables the sensors to detect light arriving from the front of the apparatus. The inactive regions 11a–29a of the sensors are located beyond the rises. A first end of each sensor is oriented towards a reference plane 39. This includes situations in which the tip of the first end extends through the reference plane, which could occur, for example, if parallelogram-shaped or diamond-shaped sensors are used, as depicted in FIG. 5.

Returning to FIG. 3, at the rear of the apparatus, a strip-shaped composite active area is formed by the contiguous arrangement of the active areas of the sensors 11–13. This composite active area is one sensor in height and is bounded by a band of inactive regions 11a–13a. A second strip-shaped composite active area one sensor in height is formed by the contiguous arrangement of the active areas of the sensors 14–16. The active areas of the second strip are positioned directly in front of the inactive regions 11a–14a of the first strip, so as to intercept any incoming light before it reaches the inactive regions.

Operation of the apparatus can be explained by following the paths of two rays of light through the apparatus. A first ray of light 31 that is aimed at a particular point 32 on a sensor 11 strikes that point 32, which causes the sensor 11 to generate an output. A second ray of light 33 that is aimed at a point 34 on the sensor 11, which is in the inactive region 11a, never arrives at that point 34 because the ray 33 strikes a point 35 on another sensor 14 before reaching the rear sensor 11. Because the point 35 is located in the active area of the sensor 14, the sensor 14 generates an output in response to the ray of light 33. Thus, the second strip effectively extends the composite active area beyond the original 1×3 array of sensors.

The composite active area can be extended repeatedly in this manner. For example, the inactive regions 14a–16a of sensors 14–16 are covered by the active areas of sensors 17–19 in the same way as the inactive regions 11a–13a of the sensors 11–13 are covered by the active areas of sensors 14–16.

The effective area of the apparatus can be doubled by adding a second section on the opposite side of a reference plane 39. On the rearmost section, sensors 21–23 butt up against each other and against sensors 11–13 to form a 2×3 sensor composite detector. The inactive regions 21a–23a of sensors 21–23 are covered by active areas of more forward sensors 24 and 25 (and other sensors not shown). The second section operates in the same way as the section described above. Adding this second section decreases the required depth of focus by a factor of two, as compared to a single section apparatus: Instead of increasing with each row of sensors, the required depth of focus for a dual section apparatus only increases with every two rows of sensors.

An image processing system (not shown) processes the outputs of each of the sensors in the apparatus. This image processing system can combine the image information from the individual sensors into a composite image, which may then be displayed or stored.

If the large area image detector is used to detect x-rays or other types of radiation, a scintillator screen may be disposed on the front face of the fiber optic assembly. The scintillator screen 42 shown in FIG. 4a converts incoming x-rays to radiation of another frequency such as IR, visible, or UV light. The light is then transmitted through the fiber optic assembly 30 and detected by the sensors 11–26. Thus, the x-ray image arriving at the face of the apparatus is converted to an optical image which is then transmitted to the sensors on the rear of the apparatus. Examples of suitable scintillators include gadolinium oxysulfide $Gd_2SO_5$, thallium-doped cesium iodide CsI(Tl), cadmium telluride, cadmium sulfide, calcium tungstate $CaWO_4$, zinc sulfide and zinc cadmium sulfide.

When a fiber optic assembly is used, the flat front surface created by the fiber optic assembly provides a number of advantages: The apparatus becomes easy to handle, because the unit will have a uniform and easy to hold surface. It also becomes easy to clean, because there are no corners to collect dirt and debris. This quality is particularly important if the apparatus is used for medical applications. In addition, the flat front surface provides a convenient base upon which to dispose a flat object. If the apparatus is used to detect light, then a planar filter that passes only certain wavelengths of light can be placed on top of the fiber optic assembly.

While the embodiment described above uses a fiber optic assembly, that element is not necessary to practice the invention. The sensors may be supported by their substrate sides in the same configuration by various mounting methods. Alternatively, as shown in FIG. 4c, the sensors may be supported by a material 40 that is transparent at the appropriate wavelength, with the active regions of the sensors 11–19 and 21–29 facing towards the transparent material 40. Glass and clear plastic are suitable transparent materials at optical frequencies. Many plastics are suitably transparent at x-ray frequencies.

Note that, while the sensors may be parallel to one another, as shown in FIG. 4A, they may also be non-parallel, as shown in FIG. 4c.

Instead of fiber optics, other systems, such as lenses, may be used to focus the image on the sensors. Focussing may not be necessary at all in certain applications, particularly when the front-to-rear distance between the sensors is small enough for all the sensors to be within the depth of focus.

The apparatus can also be used to detect radiation without using a fiber optic assembly: Individual scintillators can be disposed on the face of each sensor to convert the incoming x-rays to light, which is detected by the sensors. Alternatively, the scintillator can be omitted entirely. While CCDs and photodiodes are far more sensitive to light than to x-ray radiation, they are sufficiently sensitive to detect x-rays without a scintillator.

If no fiber optic assembly is used, a flat plate of glass or an x-ray transparent material may be used to provide the advantages of a flat surface, as described above.

The flat surface provided by either the fiber optic assembly or the x-ray transparent plate can also be used to support a sheet of photographic x-ray film 43 (see FIG. 4a). This allows a conventional x-ray picture to be taken simultaneously with an electronic x-ray image. The photographic film does not disturb the electronic x-ray imaging because most of the x-rays arriving on one side of an x-ray film pass through the film without being absorbed. Capturing both electronic and photographic images simultaneously provides certain advantages because the two processes complement each other. Specifically, the photographic process provides a high quality, permanent, portable image that can be viewed without special hardware, while electronic imaging provides an instantaneous image that can be readily processed and stored by a computer and transmitted to remote locations via modem. In addition, the instantaneous electronic image can reveal problems that will eventually appear on the x-ray film, such as blurring caused by a patient's movement. The operator can then discard the problematic film and take a new exposure immediately, without waiting for the developing process to reveal the problem.

FIG. 5 depicts a view, looking in from the front, of another embodiment of the present invention. This embodiment is constructed with sensors 501–512 that have rectangular active areas 501a–512a at the first end of each sensor, and inactive regions 501b–512b on two edges of each sensor 501–512. The first end of each of the sensors is oriented towards the reference plane 539. For some of the sensors 501–503 and 507–509, the first end of the sensor passes through the reference plane.

Sensors 501–503 and 507–509 are located on the rearmost level of the apparatus. The active areas 501a–503a and 507a–509a of these sensors are butted up next to one another to form a contiguous, composite active area. This composite active area is bounded by a zigzag boundary of inactive regions 501b–503b on the first side of reference plane 539 (which extends out of the page), and 507b–509b on the other side of the reference plane 539.

Portions of this boundary on the first side of the reference plane 539 are covered by the active area 504a, 505a of sensors 504, 505, which are located in front of the rearmost sensors in an overlapping diamond pattern. The sensors in this pattern are preferably rectangular or square. Thus, when a ray of light arrives from the front of the device aimed at a point 520 on inactive region 501b, the ray will strike the active area 504a of sensor 504 before it arrives at the inactive region 501b. The inactive regions 504b and 505b are similarly covered by the active area 506a of another sensor 506. This arrangement can be extended indefinitely by adding more sensors on the rearmost level, and covering up all of the inactive regions in a similar manner.

On the other side of the reference plane 539, the inactive regions 507b–511b are preferably covered up by active areas 510a–512a in a similar manner. This extends the array in the opposite direction. The detector can also be made on a single side of the reference plane by omitting the sensors on one side of the plane and adding extra levels of sensors to extend the array in a single direction.

The fiber optic assembly, photographic x-ray film holder, image processing system and various scintillators, all described above, may optionally be used in this embodiment as well.

While the present invention has been described above in terms of specific embodiments, it is to be understood that the invention is not limited to the disclosed embodiments. On the contrary, the present invention is intended to cover various modifications and equivalent structures included within the spirit and scope of the appended claims.

What is claimed is:

1. A radiation detection apparatus for detecting radiation arriving from in front of the apparatus, comprising:

a first set of radiation sensors arranged in a first plane, on a first side of a reference plane;

a second set of radiation sensors arranged in a second plane, on a second side of the reference plane; and a third set of radiation sensors arranged in a third plane, in front of the first plane, on the first side of the reference plane, wherein each of the sensors has an active area at a first end of the sensor, and an inactive region, and the first end is oriented towards the reference plane, and wherein the active area of the third set of sensors is disposed in front of the inactive region of the first set of sensors.

2. The apparatus according to claim 1, wherein the active area of each of the sensors extends close to a plurality of edges of each of the sensors.

3. The apparatus according to claim 2, wherein the active area of a sensor on a given plane abuts an active area of a neighboring sensor on the given plane.

4. The apparatus according to claim 3, wherein the set of radiation sensors arranged in the first plane comprises at least three sensors.

5. The apparatus according to claim 3, wherein the first end of each of said radiation sensors is shaped like the end of a rectangle.

6. The apparatus according to claim 3, wherein the first end of each of said radiation sensors is shaped like the end of parallelogram.

7. The apparatus according to claim 1, further comprising a fourth set of radiation sensors arranged in a fourth plane, in front of the second plane, on the second side of the reference plane, wherein the active area of the fourth set of sensors is disposed in front of the inactive region of the second set of sensors.

8. The apparatus according to claim 7, further comprising a fifth set of radiation sensors arranged in a fifth plane, in front of the third plane, on the first side of the reference plane, wherein the active area of the fifth set of sensors is disposed in front of the inactive region of the third set of sensors.

9. The apparatus according to claim 1, wherein the first plane, the second plane, and the third plane are substantially parallel.

10. The apparatus according to claim 9, wherein the reference plane is substantially perpendicular to the first plane.

11. The apparatus according to claim 1, wherein the first plane is the same as the second plane.

12. The apparatus according to claim 1, wherein each radiation sensor comprises one of a CCD, a photodiode array, and a CMOS active pixel sensor.

13. The apparatus according to claim 1, wherein said sensors are sensitive to x-rays.

14. The apparatus according to claim 13, further comprising a radiation transparent assembly to transmit radiation from a front surface of said transparent assembly to said sensors.

15. The apparatus according to claim 14, wherein the active areas of said sensors are mounted facing a plurality of rear surfaces of said transparent assembly and the inactive regions of said sensors are located beyond the rear surfaces of said transparent assembly.

16. The apparatus according to claim 15, wherein said transparent assembly is made of plastic.

17. The apparatus according to claim 13, wherein each of said sensors comprises a scintillator screen disposed on the face of an optical image sensor.

18. The apparatus according to claim 1, wherein said sensors are sensitive to light.

19. The apparatus according to claim 18, further comprising a fiber optic assembly to transmit light from a front surface of said fiber optic assembly to said sensors.

20. The apparatus according to claim 19, further comprising a scintillator disposed on the front surface of said fiber optic assembly.

21. The apparatus according to claim 19, wherein the active areas of said sensors are mounted facing a plurality of rear surfaces of said fiber optic assembly and the inactive regions of said sensors are located beyond the rear surfaces of said fiber optic assembly.

22. The apparatus according to claim 20, further comprising a film holder capable of supporting a photographic x-ray film, and wherein the front surface of the fiber optic assembly is substantially flat.

23. The apparatus according to claim 1, further comprising a film holder capable of supporting a photographic x-ray film.

24. The apparatus according to claim 1, further comprising an image processing system.

25. A radiation detection apparatus for detecting incident radiation arriving from in front of the apparatus comprising:
a first set of radiation sensors arranged in a first plane substantially perpendicular to a path followed by the incident radiation, each of the radiation sensors of the first set having an active area and an inactive region;
a second set of radiation sensors arranged in a second plane substantially perpendicular to the path, each of the radiation sensors of the second set having an active area and an inactive region, wherein the active areas of at least some of the radiation sensors of the second set are disposed in front of at least some of the inactive regions of sensors of the first set; and
a third set of radiation sensors arranged in a third plane substantially perpendicular to the path, each of the radiation sensors of the third set having an active area, wherein the active areas of at least some of the radiation sensors of the third set are disposed in front of at least some of the inactive regions of sensors of the second set.

26. The apparatus according to claim 25, wherein the active area of each of the sensors extends close to a plurality of edges of each of the sensors.

27. The apparatus according to claim 26, wherein the active area of a sensor on a given plane abuts an active area of a neighboring sensor on the given plane.

28. The apparatus according to claim 27, wherein the set of radiation sensors arranged in the first plane comprises at least three sensors.

29. The apparatus according to claim 27, wherein the first end of each of said radiation sensors is shaped like the end of a rectangle.

30. The apparatus according to claim 27, wherein the first end of each of said radiation sensors is shaped like the end of parallelogram.

31. The apparatus according to claim 25, wherein each radiation sensor comprises one of a CCD, a photodiode array, and a CMOS active pixel sensor.

32. The apparatus according to claim 25, wherein said sensors are sensitive to x-rays.

33. The apparatus according to claim 32, further comprising a radiation transparent assembly to transmit radiation from a front surface of said transparent assembly to said sensors.

34. The apparatus according to claim 33, wherein the active areas of said sensors are mounted facing a plurality of rear surfaces of said transparent assembly and the inactive regions of said sensors are located beyond the rear surfaces of said transparent assembly.

35. The apparatus according to claim 34, wherein said transparent assembly is made of plastic.

36. The apparatus according to claim 32, wherein each of said sensors comprises a scintillator screen disposed on the face of an optical image sensor.

37. The apparatus according to claim 25, wherein said sensors are sensitive to light.

38. The apparatus according to claim 37, further comprising a fiber optic assembly to transmit light from a front surface of said fiber optic assembly to said sensors.

39. The apparatus according to claim 38, further comprising a scintillator disposed on the front surface of said fiber optic assembly.

40. The apparatus according to claim 38, wherein the active areas of said sensors are mounted facing a plurality of rear surfaces of said fiber optic assembly and the inactive regions of said sensors are located beyond the rear surfaces of said fiber optic assembly.

41. The apparatus according to claim 39, further comprising a film holder capable of supporting a photographic x-ray film, and wherein the front surface of the fiber optic assembly is substantially flat.

42. The apparatus according to claim 25, further comprising a film holder capable of supporting a photographic x-ray film.

43. The apparatus according to claim 25, further comprising an image processing system.

44. A radiation detecting apparatus comprising:
a fiber optic assembly having an input side, an stepped output side with a plurality of rises, and optical fibers that transmit light from the input side to the rises of the output side; and
a plurality of radiation sensors, each sensor having a first end with a rectangular active area extending close to the edges of the first end, and a inactive region, wherein the active areas of said sensors are located adjacent to said fiber optic assembly, facing the rises, and the inactive region is located above the rises, so that light passing through the fiber optic assembly strikes the active area of said sensors and does not strike the inactive region, and wherein at least two of said sensors are mounted on a given rise butted up next to each other to form a substantially continuous array of active areas.

45. The apparatus according to claim 44, further comprising a scintillator disposed on the front surface of said fiber optic assembly.

46. The apparatus according to claim 44, further comprising a film holder capable of supporting a photographic x-ray film.

47. The apparatus according to claim 44, further comprising an image processing system.

* * * * *

UNITED STATES PATENT AND TRADEMARK OFFICE
CERTIFICATE OF CORRECTION

PATENT NO. : 5,834,782

DATED : November 10, 1998

INVENTOR(S) : DAVID B. SCHICK ET AL.  Page 1 of 2

It is certified that error appears in the above-identified patent and that said Letters Patent is hereby corrected as shown below:

On the title page, item:
[57] ABSTRACT

Line 4, "a" should read --an--.

COLUMN 1

Line 48, "film based" should read --film-based--.

COLUMN 4

Line 4, "Additional" should read --¶ Additional--.
　　Line 23, "a" should read --an--.

COLUMN 7

Line 67, "area 504a," should read --areas 504a,--.

COLUMN 8

Line 59, "parallelogram." should read
　　　　--a parallelogram.--

UNITED STATES PATENT AND TRADEMARK OFFICE
CERTIFICATE OF CORRECTION

PATENT NO. : 5,834,782

DATED : November 10, 1998

INVENTOR(S) : DAVID B. SCHICK ET AL.

It is certified that error appears in the above-identified patent and that said Letters Patent is hereby corrected as shown below:

<u>COLUMN 10</u>

```
Line 19, "parallelogram." should read
  --a parallelogram.--
Line 60, "an" (second occurrence) should read --a--.
Line 67, "a" should read --an--.
```

Signed and Sealed this

Seventh Day of September, 1999

Attest:

Q. TODD DICKINSON

*Attesting Officer*   *Acting Commissioner of Patents and Trademarks*